Aug. 17, 1954     E. L. LILJA     2,686,597
LIQUID STRAINING CLOSURE FOR CONTAINERS
Filed May 3, 1951
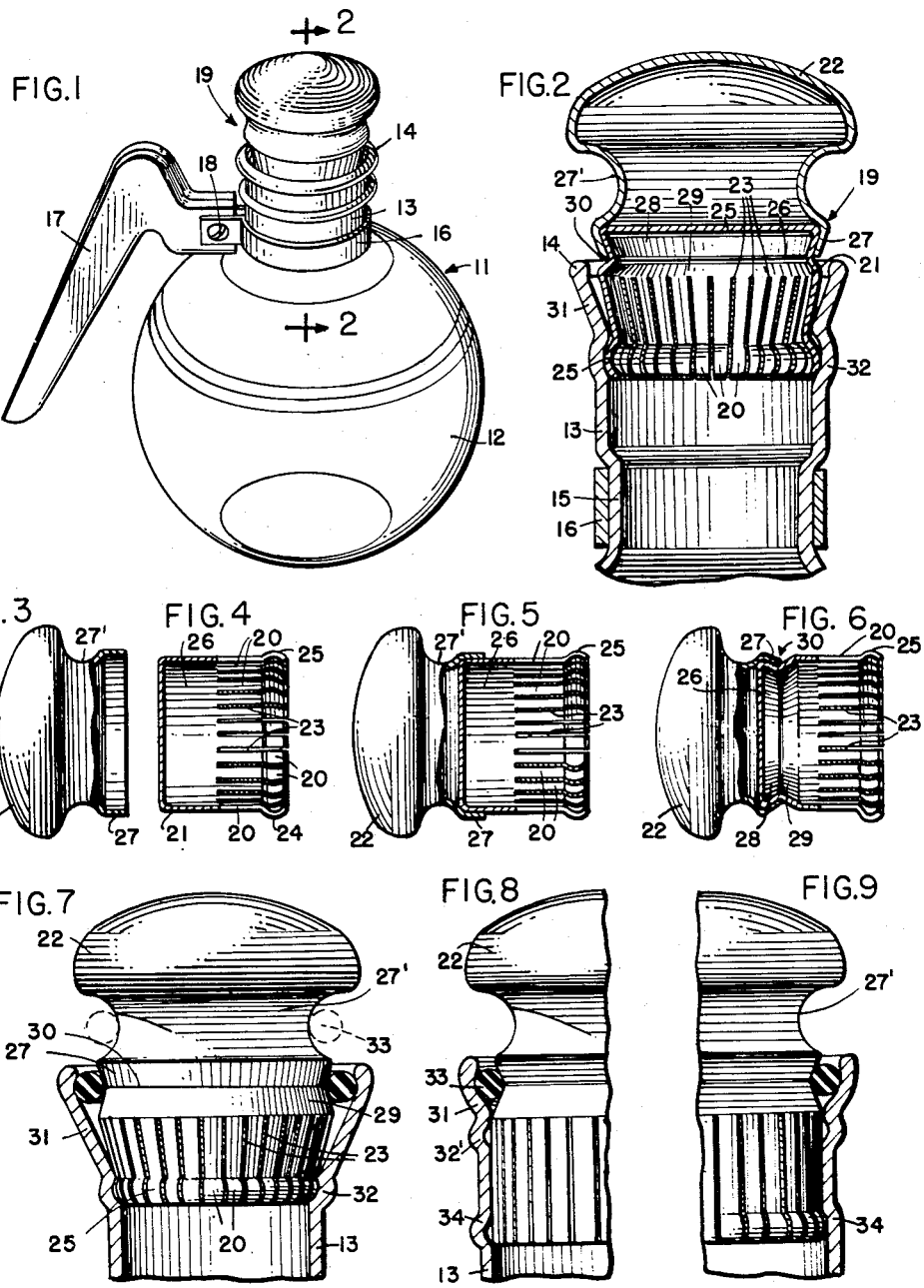
INVENTOR:—
ERNEST L. LILJA
BY:—
Spencer, Johnston, Cook & Root
ATT'YS

Patented Aug. 17, 1954

2,686,597

UNITED STATES PATENT OFFICE 2,686,597

LIQUID STRAINING CLOSURE FOR CONTAINERS

Ernest L. Lilja, Chicago, Ill., assignor, by mesne assignments, to Club Aluminum Products Company, Chicago, Ill., a corporation of Illinois Application May 3, 1951, Serial No. 224,281

3 Claims. (Cl. 210—163.5)

The present invention relates in general to liquid containing and pouring vessels, and has more particular reference to the provision of improved means, in such a vessel, for straining liquids during the pouring thereof from the vessel.

An important object of the invention is to provide improved means, in a liquid containing and dispensing vessel, for straining liquid as the same is being dispensed from the vessel, whereby to remove particles of material from the liquid and to retain the so removed material at the straining means; a further object being to form the straining means as a structural unit adapted for removable mounting on the vessel at a liquid discharge outlet thereof.

Another important object of the invention is to provide liquid strainer means adapted to be removably mounted in the neck-like outlet of a liquid containing vessel; a further object being to form the strainer means as a cover for said outlet; still another object being to form the strainer means and the neck-like outlet of the vessel with interfitting latch means for retaining the strainer means removably on the neck-like outlet of the vessel.

Another object is to provide a combined cover and strainer device adapted for removable mounting in the neck-like pouring outlet of a liquid containing vessel; a further object being to provide a device of the sort mentioned which will accommodate itself to neck-like outlets of any size within a substantial variant size range.

Another object is to provide a liquid straining cover particularly adapted for removable mounting in the usually cylindrical pouring neck of flasks; a further object being to provide a convenient device adapted to serve as a cover and as a pouring strainer for the pouring neck of flask-like containers of the sort commonly employed for the brewing of tea, coffee and the like.

Another object is to provide a flask cover and strainer of simple inexpensive construction comprising resilient peripherally disposed fingers adapted to fit within and engage the inner surface of the pouring neck of a flask to form a strainer for liquid passing through the pouring neck; a further object being to form the pouring neck and fingers for latching engagement whereby to employ the resilience of said fingers to hold the strainer latched to said neck; still another object being to provide a mounting for said fingers comprising a handle or knob by means of which the device may be readily manipulated; yet a further object being to form the finger mounting as a cover for the pouring neck.

Another object of the invention is to provide a flask cover and strainer of inexpensive sheet metal construction; a further object being to provide a strainer comprising a sheet metal element having a sleeve-like skirt portion longitudinally slitted to form spaced apart resilient strainer fingers; a further object being to provide a manipulating knob or handle for the strainer element comprising a formed sheet metal part secured in place by a simple metal spinning operation.

Another object is to provide a device of the character mentioned which may be employed in the outlet of a liquid containing vessel in position either to strain liquid passing through the outlet, or to seal the outlet against passage of liquid therethrough.

Among other important objects of the invention is to provide a device of the character described which may be easily cleaned and sterilized as by immersion in boiling water; to provide a device comprising inert material which will not break or otherwise deteriorate in service; and, in general, to provide an inexpensive, convenient flask strainer-stopper of rugged, substantially indestructible character, which is self-adjusting to the vessel in which the device is used, and which consequently is especially well suited for use in beverage flasks.

The foregoing and numerous other important objects, advantages and inherent functions of the invention will become apparent from the following description, which, taken in connection with the accompanying drawings, describes preferred embodiments of the invention.

Referring to the drawings:

Fig. 1 is a perspective view of a flask and liquid strainer embodying the invention;

Fig. 2 is a sectional view on line 2—2 in Fig. 1;

Figs. 3 and 4 are sectional views through the parts of the strainer prior to assembly thereof;

Figs. 5 and 6 are sectional views through the parts of the strainer during successive stages of the assembly of said parts; and Figs. 7, 8 and 9 are sectional views, similar to Fig. 2, but showing modified arrangements of the flask structure.

To illustrate the invention the drawings show a liquid containing vessel in the form of a flask 11 comprising an enlarged body portion forming a bowl 12, and an upstanding hollow and open ended neck 13 forming an outlet or spout, through which liquid may be introduced into or poured from the bowl, said neck being attached, at one end, in open communication with the bowl and forming a peripheral pouring lip 14 at its other end. While the invention, of course, is not necessarily restricted to beverage brewing vessels, the flask illustrated is particularly adapted for tea or coffee brewing purposes, in that its neck 13 is of relatively large size to facilitate introduction of a supply of tea leaves or of ground coffee, into the bowl, through the said neck, for brewing purposes in the bowl, and to facilitate the removal of used tea leaves or coffee grounds from the flask, in cleaning the same, after completion of a brewing operation. If desired, any suitable handle means may be provided or formed on the flask. To this end the neck may be formed with a peripheral outwardly opening groove 15 therein, for the reception of a preferably sheet metal handle mounting band 16. The band may provide central neck clamping portions and spaced apart ends projecting outwardly of the neck and between which ends a handle 17 may be secured as by means of a suitable fastening member such as the bolt 18.

A liquid strainer 19 is also provided to allow liquid to be poured from the flask, through the neck and over the pouring lip 14, while retaining tea leaves, coffee grounds or other material entrained in said liquid, on the strainer within said neck. The strainer comprises a structure forming a mounting and a plurality of spaced apart and peripherally arranged resilient strainer fingers 20 disposed on said mounting in position to engage and fit within the walls of the neck 13, said mounting serving also to form a cover for the open end of the neck and a handle or knob to facilitate manipulation of the strainer in applying the same in operative position in the neck, and in removing the strainer from neck mounted position.

While the strainer may be made in various ways and of any suitable material, the same preferably comprises a pair of sheet metal parts 21 and 22, which may be formed of somewhat soft and malleable metal having sufficient resilience to accomplish the hereinafter described strainer latching function.

The part 21 may comprise a sleeve provided with a plurality of liquid straining openings or slits 23 therein. These slits are preferably formed longitudinally in the sleeve and extend therein from adjacent one end of said sleeve to the opposite end thereof, said slits opening at said end to define the resilient fingers 20 therebetween. The fingers are bent to form outwardly bowed latch portions 25 preferably disposed at the free ends of the fingers. The sleeve is preferably closed, as by means of an integral closed end, at the finger remote end of the sleeve, the sleeve providing a preferably imperforate tubular wall 26 between its upper closed end and the basal or sleeve mounted ends of the fingers, whereby said wall forms a mounting for said basal ends of the fingers.

The part 22 may comprise a sheet metal element shaped to form a preferably hollow knoblike handle having a peripheral groove 27' in the medial portions of the element and a peripheral flange 27 sized to snugly receive the finger remote end of the part 21, to the extent indicated in Fig. 5 of the drawings. After assembly of the parts as shown in said Fig. 5, the flange 27 may be crimped inwardly upon the wall portion 26, as by spinning the parts while pressing the flange inwardly, to secure the parts together, as shown in Fig. 6. The wall 26, as a result of such operation is also deformed inwardly to provide a grooved section comprising relatively bent portions 28 and 29 of the wall 26. It will be seen that the parts 21 and 22 will be locked firmly together by the engagement of the crimped flange 27 in the groove formed by the wall portions 28 and 29, and that the joined parts form a peripheral, outwardly opening and shallow groove 30, at the flange 27 and the wall portion 29, adjacent the basal portions of the fingers 20, which are attached to the edge of the wall portion 29 remote from the crimped flange 27.

The upper or open end of the neck 13, at the lip 14, is appreciably larger than the sleeve member 21. Inwardly of the lip 14, however, the neck is formed with an inwardly tapering portion 31. This portion, as shown in Figs. 2 and 7, may taper down to a neck size smaller than the sleeve 21, and is formed with an inwardly opening latching groove 32 shaped to receive the latching projections 25 on the fingers 20. Accordingly, the strainer member 19 may be applied in the neck of the flask merely by inserting the free ends of the fingers downwardly into the open end of the neck until the projections latch in the groove 32. In riding downwardly on the tapering portion 31, the fingers will bend inwardly on the wall portion 29 at the basal ends of the fingers, to thus accommodate the fingers to the size of the neck; and the resilience of the material of the fingers will cause the same to yieldingly latch with the groove portion 32 of the neck, to which the latching ends of the fingers are guided by the tapered neck section of the neck. The latching effect, of course, is of non-positive character so that the strainer may be instantly removed merely by pulling it from mounted position, by means of the handle or knob provided by the part 22.

It will be seen also that the strainer structure affords a substantial cover for the open end of the neck, although in the Fig. 2 embodiment the cover does not operate to seal the open end of the neck of the flask. A sealing closure however may be obtained, as shown in Fig. 7, by applying a gasket ring 33 of resilient material, such as neoprene, on the strainer element. For flask sealing purposes, the gasket ring 33 may be disposed in the groove 30 of the strainer, in position to sealingly engage the neck within the lip 14, as shown in solid lines in Fig. 7. In this connection, the tapered portion 31 of the neck should be sized and shaped to present the lip 14 at such distance from the latching groove 32 as to permit the ring 33, in the mounting groove 30, to sealingly engage within the lip 14, when the latching portions of the fingers 20 are engaged with the latch groove 32. To arrange the device for the pouring of liquid, it is merely necessary to dispose the gasket on the strainer, out of the groove 30, as by rolling the same to the dotted line position, in the groove 27', in Fig. 7.

As shown in Figs. 8 and 9, the minimal neck size, at the inner end of the tapered portion 31 may be made substantially equal to the size of the finger sleeve part 21. The neck, at or near the inner end of the tapered portion 31 may be formed with a latching groove 32' to receive the latching portions 25 of the fingers, to secure the strainer in pouring position. Inwardly of the groove 32', the neck may be formed with an internal latching shoulder 34, which may comprise a groove, as shown in Fig. 8, or shoulder facing inwardly toward the bowl, as shown in Fig. 9.

This shoulder is positioned on the neck to latchingly receive the finger portions 25 when the strainer is positioned in sealing position in the neck with the groove 30 within the lip 14 in position disposing the groove mounted gasket 33 in position to seal with the lip.

The fingers, since they comprise somewhat soft or malleable material may be bent outwardly on the finger mounting portion 26 and will retain the position to which bent, until inserted in the tapered portion 31. Thereupon the wedging action of said portion will bend the fingers inwardly to exactly fit the size and configuration of the particular vessel in which mounted. The strainer device is thus self adjusting to the vessel or container to which it may be applied. The finger material however should have sufficient resilience to perform the latching function of the fingers in the notches 32, 32' and 34, after being bent as aforesaid in fitting the strainer to the vessel.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An exterior closure element to fit within the pouring neck of a container to strain liquids through the element as liquid is poured out of said neck, comprising a tubular sleeve having an imperforate upper wall part and a strainer lower part, said lower part having spaced longitudinal slits formed circumferentially thereabout and extending downwardly from the imperforate wall part to provide spring fingers, the fingers being bowed outwardly to form a circumferential resilient slitted bead-like body adapted to interfit and latch with a groove formed in the neck of the container, an imperforate end closing one end of the sleeve and integral with the sleeve, and a handle fastened to the sleeve exterior of its closed end and adjacent thereto to permit vertical manual longitudinal manipulation of the sleeve.

2. A closure element to fit within the pouring neck of a container to strain liquid therethrough as liquid is poured out of said neck, comprising a tubular sleeve having an imperforate upper wall part and a strainer lower part, said lower part having spaced longitudinal slits formed circumferentially thereabout and extending downwardly from the imperforate wall part to provide spring fingers, the fingers being bowed outwardly to form a circumferential resilient slitted bead-like body adapted to interfit and latch with a groove formed in the neck of the container, an imperforate end closing one end of the tubular sleeve and integral therewith, an exterior knob-like handle adapted to be secured to the sleeve at the wall part, and fastening means securing the sleeve to the handle, said fastening means comprising an annular extension on the handle projecting into an annular recess formed in the wall part of the sleeve, the annular extension being fitted into the annular recess by forcing the extension into the recess by a spinning operation.

3. An exterior closure element to fit within the pouring neck of a container to strain liquid through the element as liquid is poured out of said neck comprising a tubular sleeve having an imperforate upper wall part and a strainer lower part, said lower part having spaced longitudinal slits formed circumferentially thereabout and extending downwardly from the imperforate wall part to provide spring fingers, the fingers being bowed outwardly to form a circumferential resilient slitted bead-like body adapted to interfit and latch with a groove formed in the neck of the container, an end closure integral with the wall part remote from the fingers to close one end of the sleeve, an exterior knob-like handle adapted to be secured to the sleeve at the end closure, fastening means securing the sleeve at the end closure to the handle, said fastening means comprising an annular extension on the handle projecting into an annular recess formed in the wall part of the sleeve, the annular extension being fitted into the annular recess by forcing the extension into the recess by a spinning operation, and sealing means about the handle and receivable in the neck to form a seal between the inside of the neck and the outside of the handle.

References Cited in the file of this patent

UNITED STATES PATENTS

| Number | Name | Date |
| --- | --- | --- |
| 178,348 | Tingley | June 6, 1876 |
| 450,932 | Gibson | Apr. 21, 1891 |
| 845,257 | Pick | Feb. 26, 1907 |
| 992,268 | Schmidt | May 16, 1911 |
| 1,788,760 | Applegate | Jan. 13, 1931 |
| 1,976,620 | Macbeth | Oct. 9, 1934 |
| 2,072,324 | Wolcott | Mar. 2, 1937 |
| 2,378,355 | Cobel | June 12, 1945 |
| 2,392,656 | Foster | Jan. 8, 1946 |
| 2,461,736 | Hooper | Feb. 15, 1949 |
| 2,554,748 | Lewis | May 29, 1951 |
| 2,568,181 | Zimmerman et al. | Sept. 18, 1951 |